Aug. 30, 1955          J. M. DINES          2,716,671
CUPROUS CHLORIDE MAGNESIUM PRIMARY BATTERIES
Filed May 3, 1952
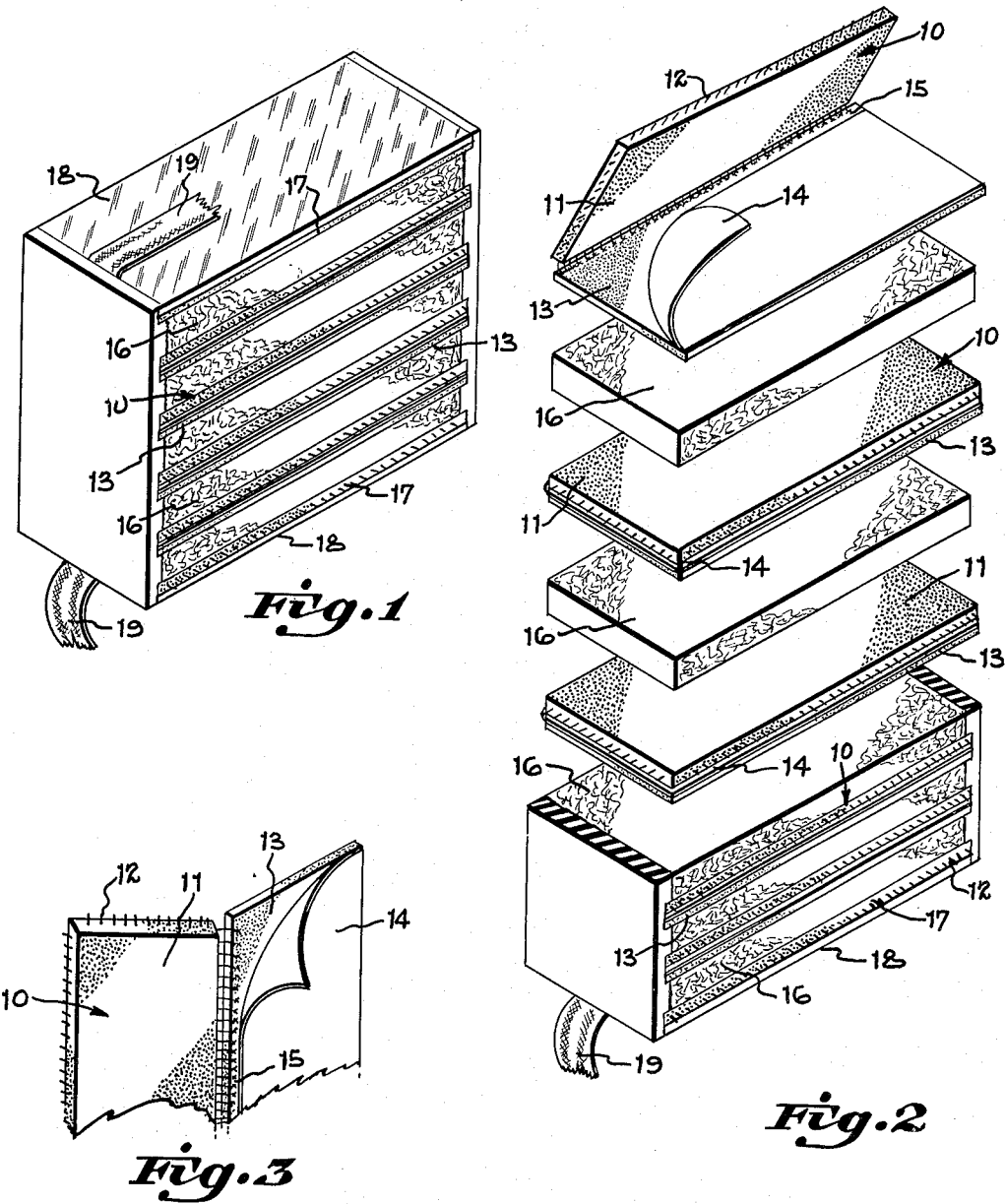
INVENTOR.
BY James M. Dines
Wood, Herron & Evans
ATTORNEYS.

United States Patent Office 2,716,671
Patented Aug. 30, 1955

2,716,671

CUPROUS CHLORIDE MAGNESIUM PRIMARY BATTERIES

James M. Dines, Joplin, Mo., assignor to The Eagle-Picher Company, Cincinnati, Ohio, a corporation of Ohio Application May 3, 1952, Serial No. 285,920

2 Claims. (Cl. 136—90)

This invention relates to a new method of constructing cuprous chloride magnesium batteries in which water or an aqueous salt solution is used as the electrolyte. The batteries of this invention are made up of a series of flat waferlike individual cells, each of which contains a platelike cuprous chloride positive electrode and a platelike or sheetlike magnesium negative electrode, with electrode separators disposed between the two electrodes, the electrode separators preferably being bibulous cellulosic pads which hold the electrolyte by absorption so that there is no free liquid electrolyte to spill. This type of battery is kept dry until just before the time of use at which time it is dunked in water or salt solution to saturate the bibulous pads which separate the electrodes of the individual cells. After being activated, the cuprous chloride magnesium battery must be discharged fully as the action of the water on the cuprous chloride electrodes tends to disintegrate it physically. Therefore, the battery must be discharged within a few hours after activation or, otherwise, the effectiveness of the battery is destroyed without production of useful electrical current.

In co-pending applications, Serial No. 172,558, filed July 7, 1950, entitled "Electric Battery," now Patent No. 2,684,395, dated July 20, 1954, and Serial No. 181,248, filed August 24, 1950, entitled "Method of Making Electric Batteries," now Patent No. 2,684,481, dated July 20, 1954, cuprous chloride magnesium batteries of the general type to which the present invention is applicable are disclosed and claimed. The batteries of those applications comprise waferlike cells of like facial area disposed face to face with positive and negative electrodes separated within the same cell by bibulous pads. In the batteries of the said applications, the cells are individuated by means of sheet copper cell partitions which are held together longitudinally of the battery by means of thermally set plastic which is more or less bonded to the edges of the copper cell partitions on at least two opposite sides of the battery.

The object of the present invention is to provide a battery of the general type disclosed in the identified co-pending applications in which the copper cell partitions are dispensed with. This is accomplished by substituting plastic adhesive tape on the back of each magnesium electrode whereby the tape insulates the magnesium electrode to which it is applied from contact with the electrolyte of the adjacent cell of which the magnesium electrode forms no part. I have discovered that this plastic tape is sufficient to provide the requisite insulation after activation and during the following period in which a cuprous chloride magnesium battery is capable of delivering a useful electrical current.

Other objects and further advantages will be more readily understood in relation to the descriptions of the accompanying drawings in which:

Figure 1 is a perspective view of the finished battery.

Figure 2 is an exploded view otherwise similar to Figure 1.

Figure 3 is a fragmentary perspective view of the junction of the electrodes of adjacent cells and the intervening cell partition which is constituted by the plastic tape.

In a typical battery which is constructed in accordance with the principles of this invention, a plurality of positive cuprous chloride electrodes 10 are fabricated by applying a cuprous chloride paste 11 to a screen grid 12. Complementary negative electrodes 13 are fabricated from sheet magnesium and plastic adhesive tape 14 is applied to them so that it covers one entire surface of the magnesium except for a small margin, such as 3/32 of an inch near the top edge 15, of the electrodes.

As disclosed in Figure 3, the top exposed edge of the magnesium electrode is welded to the top of the screen grid of the positive electrode after which the electrodes are bent to position so that the taping on the negative electrode is in the middle, that is, is interposed between the two electrodes which are welded together. The unit just described constitutes the positive of one cell and the negative of the adjacent cell with the cell partition (the tape) disposed between them.

The electrode assemblies which have just been described are then assembled in a stack with bibulous cellulosic pads 16 disposed between each assembly so that each interface between a positive and a negative electrode is occupied by either a bibulous pad or a plastic tape—the former separating the electrodes of the same cell, the latter partitioning the electrodes of adjacent cells.

After the electrode assemblies are put together in a stack with the bibulous pads as described, the terminal cells are constituted by applying bibulous pads to the faces of the end electrodes of the assembly, terminal electrodes 17 of appropriate polarity on the outsides of the pads and end closures 18 at each end of the stack. Terminal electrical connections 19 provide a lead to the electrode at each end of the battery. The stack is then held together under slight endwise pressure which slightly compresses the bibulous pads and while so held at least two opposite sides of the stack are coated with plastic cement which is thermally set. The tapes on the backs of the magnesium negatives are marginally engaged by the plastic cement which creeps between the tapes and the faces of the adjacent bibulous pads.

The exact relative dimensioning of the positive electrodes, the negative electrodes and the bibulous pads is not highly critical. From the point of view of efficiency, however, in the sense of employing the least unnecessary material, similar surface areas are desirable.

Any desired system of compatible plastic materials may be employed for effecting the disclosed assembly. The plastic elements involved are the end closures, the plastic tape which is applied to the magnesium electrodes, the thermally setting plastic element and complementary sheet materials which are used for applying the plastic cement to the stack and retaining it in engagement with the sides of the stack during the heat treatment in which the plastic cement is set.

Preferably, the thermally settable cement is a vinyl plastisol such as the copolymer of vinyl chlorides and vinyl acetate plasticizer with a solvent plasticizer such as dioctyl phthallate combined with an ester of ricinoleic acid and having a setting temperature in the neighborhood of 350° F. This plastic cement is preferably of viscous consistency approximating pastiness, so that it may be filmed on the sheeting which is applied to opposite sides of the stack and will not migrate substantially prior to or during the operation of being thermally set. During the thermal setting, the plastic cement becomes a hard, horny solid which is flexible or resilient and slightly tacky on the surface as distinguished from a hard, brittle plastic of the consistency of Bakelite.

The sheeting material, by which this cement is applied, must have enough affinity for the unset cement to retain it as a thin layer or film but the sheeting may be removed after thermal setting of the cement if desirable. On the other hand, the sheeting may be chosen so that the cement bonds to it and may be varied in thickness and strength to improve the longitudinal rigidity of the battery to any desired extent. If the sheeting is to be retained after thermally setting, as is recommended, then the sheeting should be constituted by regenerated cellulose, chlorinated rubber, methyl methacrylate or vinyl plastic.

The adhesive tape which is applied to the sheet magnesium and serves as cell partitioning may be constituted by regenerated cellulose, cellulose acetate or any other material in tape form which, by virtue of its inherent nature or by virtue of the nature of an adhesive coating applied to it, bonds to the vinyl plastisol cement during the setting of the latter.

The disclosure of the present application overlaps in part the disclosures of co-pending application, Serial No. 311,687, filed September 26, 1952, entitled Battery Construction and Method filed by Dines (the inventor herein) and Chubb. The claims herein are limited to the taping applied to the magnesium electrodes to serve as cell partitioning and claims of generic scope are reserved for the above identified co-pending application.

Having described my invention, I claim:

1. An electrolytic battery comprising a plurality of relatively thin waferlike cells of like dimensions, said cells disposed in a stack face to face with the positive electrode of each cell, except one end cell, adjacent to the negative electrode of the adjoining cell, each cell comprising a platelike cuprous chloride positive electrode, a sheet magnesium negative electrode and a bibulous pad for holding aqueous electrolyte, said pad disposed between the electrodes of the cell in facial engagement with each, cell partitions disposed between adjacent cells, said cell partitions constituted by plastic adhesive tape affixed to the faces of the sheet magnesium electrodes which face toward the adjacent cells, an electrical connection between each taped magnesium electrode and the cuprous chloride electrode of the adjacent cell, and means securing the elements of the stack together longitudinally of the stack, said means comprising a tough, resilient thermally set plastic bonded to the plastic adhesive tape affixed to the magnesium electrodes.

2. An electrolytic battery comprising a plurality of relatively thin waferlike cells of like dimensions, said cells disposed in a stack face to face with the positive electrode of each cell, except one end cell, adjacent to the negative electrode of the adjoining cell, each cell comprising a platelike cuprous chloride positive electrode constituted by a mass of powdered cuprous chloride affixed to a mesh grid, a sheet magnesium negative electrode and a bibulous pad for holding aqueous electrolyte, said pad disposed between the electrodes of the cell in facial engagement with each, cell partitions disposed between adjacent cells, said cell partitions constituted by plastic adhesive tape affixed to the faces of the sheet magnesium electrodes which face toward the adjacent cell, the metal mesh of each positive electrode welded to the magnesium electrode of the adjacent cell, whereby said positives and negatives are connected together electrically but the electrolytes of the respective cells are segregated by the plastic tape, and means securing the elements of the stack longitudinally of the stack, said means comprising a tough, resilient thermally set plastic bonded to the plastic adhesive tape affixed to the magnesium electrodes.

References Cited in the file of this patent

UNITED STATES PATENTS

| | | |
|---|---|---|
| 2,040,255 | Gordon | May 12, 1936 |
| 2,322,210 | Adams | June 22, 1943 |
| 2,428,850 | Lawson | Oct. 14, 1947 |
| 2,441,896 | Moir | May 18, 1948 |
| 2,564,495 | Mullen | Aug. 14, 1951 |
| 2,636,060 | Fischbach et al. | Apr. 21, 1953 |
| 2,639,306 | Fischbach | May 19, 1953 |
| 2,640,863 | Ellis | June 2, 1953 |

FOREIGN PATENTS

| | | |
|---|---|---|
| 443,983 | Great Britain | Mar. 11, 1936 |
| 867,151 | France | July 7, 1941 |

OTHER REFERENCES

Materials and Methods (publication), December 1946, pages 1469–1472.